United States Patent [19]

Kraus et al.

[11] 4,106,370
[45] Aug. 15, 1978

[54] ELECTRIC INFINITE-RANGE LOAD-SENSING TRANSDUCER

[76] Inventors: Robert August Kraus; Edmund Joseph Kraus, both of 14160 Redhill #39, Tustin, Calif. 92680

[21] Appl. No.: 767,138

[22] Filed: Feb. 9, 1977

[51] Int. Cl.² ............................................. F16B 31/02
[52] U.S. Cl. .................................. 73/88 F; 73/141 R; 361/283
[58] Field of Search ......... 73/141 R, 141 A, 88.5 SD, 73/88 F; 338/2, 47; 361/283, 291, 322

[56] References Cited

U.S. PATENT DOCUMENTS

| | | | |
|---|---|---|---|
| 3,260,904 | 7/1966 | Booe | 361/322 X |
| 3,307,407 | 3/1967 | Berg et al. | 361/283 X |
| 3,943,417 | 3/1976 | Patti | 361/291 |
| 3,945,704 | 3/1976 | Kraus et al. | 73/88 F |

FOREIGN PATENT DOCUMENTS 705,669  3/1931  France ...................................... 338/47

*Primary Examiner*—Charles A. Ruehl

[57] ABSTRACT

A device for the sensing and the measuring of the axial tension stresses occurring within the bolt of a threaded fastening system under installation comprising a metallic, electrically conductive flat washer-like first member, and a metallic, electrically insulated flat washer-like second member; wherein the electrically insulating material of an anodic-oxide coating, which is grown onto the second member's electrically conductive aluminum base material, is used as an intervening solid supporting substance for the purpose of spacing the first and the second member's electrically conductive surfaces, through a predetermined distance from each other, to resist a current flow therethrough; wherein, due to the anodic-oxide coating's minute compressibility under varying light to severe compressive load conditions, a change in the oxide coating's electrical leak-resistance occurs, thus allowing a very minute, detectable current to flow between the first and the second member. The minute electric current is electronically detected, measured and displayed.

6 Claims, 6 Drawing Figures

U.S. Patent
Aug. 15, 1978
4,106,370
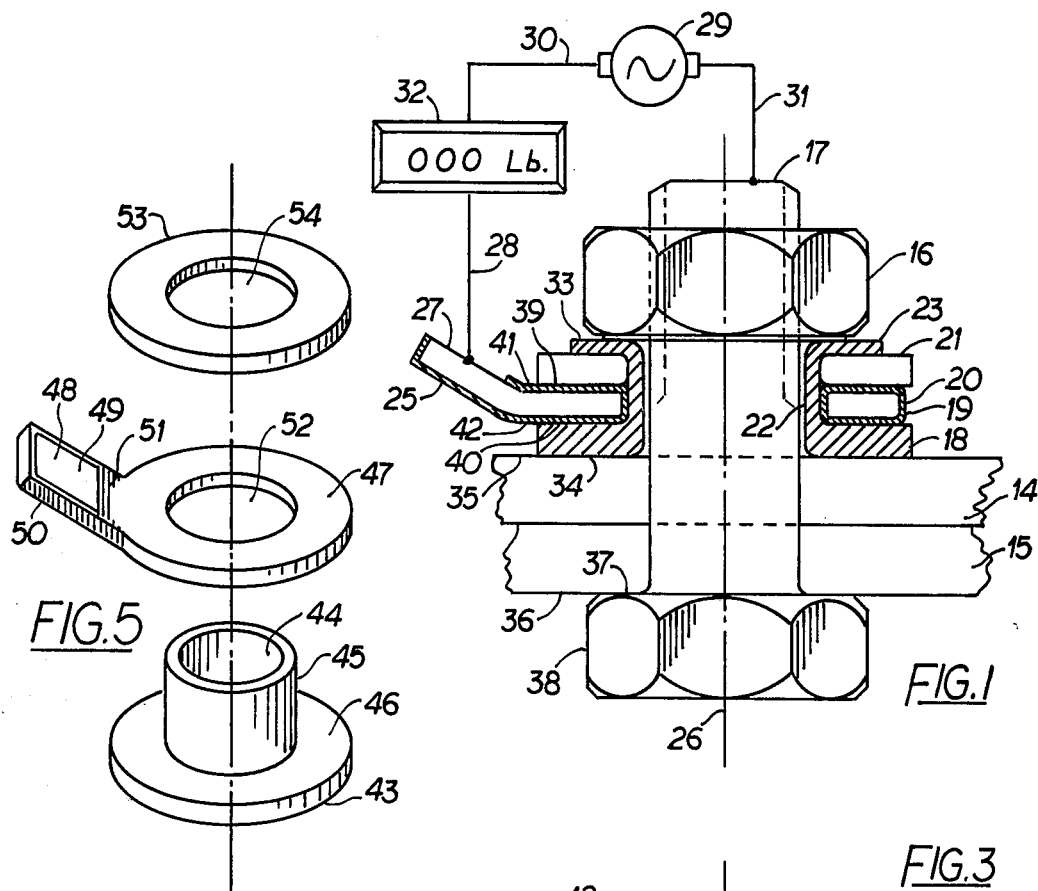
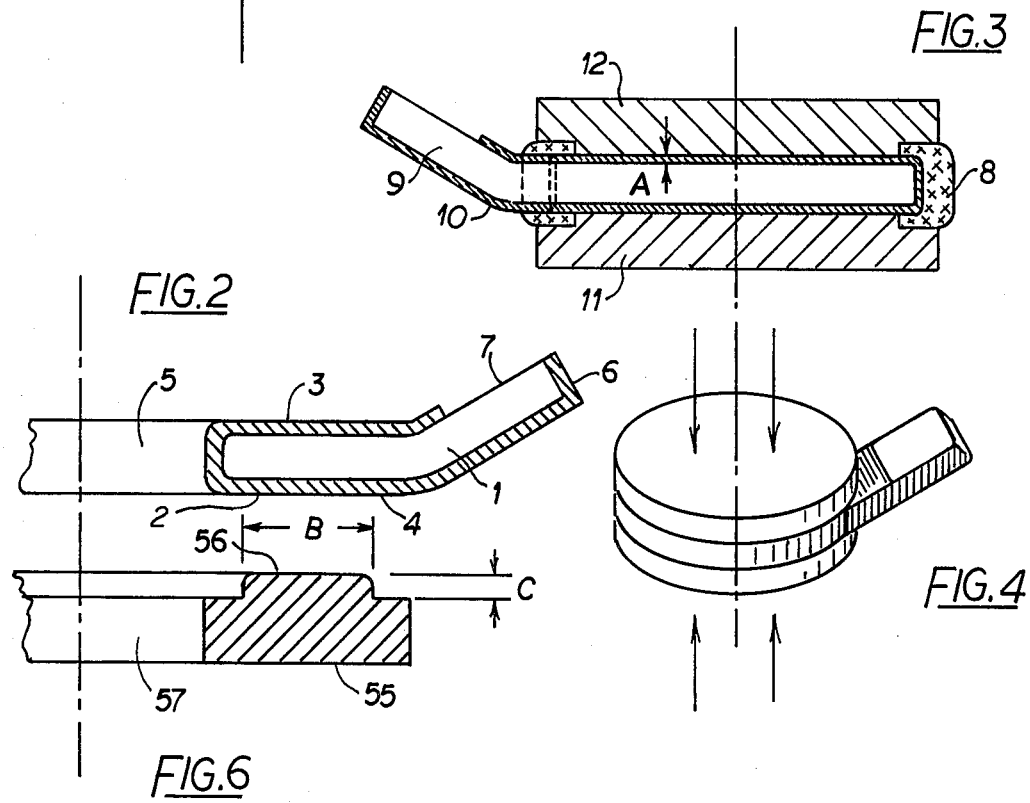

ELECTRIC INFINITE-RANGE LOAD-SENSING TRANSDUCER

THE FIELD OF THE INVENTION

To obtain an optimum strength to weight ratio of structural components, modern tensile-type threaded fastening systems or devices are required to be installed to within a high percentage of their ultimate tensile load capacity. It is, therefore, of great importance to be able to measure the magnitude of the occurring axial tension stresses within a threaded bolt of a fastening system while under installation, which axial tension stress or load may be detected, translated and indicated by and via electronic analog device and may be displayed on an electronic readout calibrated in pound force.

In another field, not related to tensile-type fastening devices, it may be desirable to measure a straight, compressive load imposed on a force transducer device comprising basically the same conceptional design characteristics and components as the device for the detection of axial stresses in tension-type fastening systems, except for the lack of a center aperture therethrough, using, however, the same electronic detection and readout devices as necessary for the devices heretofore.

THE PRIOR ART

It is common to set threaded tensile-type fastening systems or devices to a predetermined axial preload by imposing a torque on the fastening system's nut or bolt since the application of torque is regarded as being proportional to the occurring tensile stresses within a fastening system's bolt while under installation. Since, however, a threaded fastening system is far from being ideal, that is to say, being free from all limitations, such as, associated with friction, surface conditions and the relative angular advancement of a particular fastening system's thread, the use of torque for the proper setting of a fastening system's residual axial-preload is not reliable enough to satisfy the desired repeatability necessary for the obtainment of the optimum strength expected in the construction of modern structural components.

It is, therefore, better practice to measure the axial tension stresses which are occurring within a threaded fastening system's bolt during installation directly as an axially applied load imposed on a force sensing device, which is placed between the bolt-head or nut of a fastening system under installation and its parent material, which measuring technique is free of all limitations inherent with the application of torque as a means for the determination of a fastening system's proper residual preload.

OBJECT OF THE INVENTION

It is, therefore, an object of our invention to provide an electrically insulating coating which is grown onto a flat aluminum base material possessing a tenacious resistance to compressive loads and to electrical current flow, which is used as an intervening, non-destructive support material between, and to space a first metallic, electrically conductive base material through a predetermined distance from a second metallic, electrically conductive plate; wherein, due to said electrically insulating coating's minute compressibility under changing light to severe compressive load conditions, an inversely proportional change in a minute electrical current flow occurs through said insulating coating between said first and said second metallic, electrically conductive flat materials. This minute current flow may be detected and measured and, after amplification, may be used with the appropriate circuitry for the indication of the magnitude of an applied compressive force.

A further object of our invention is to provide an electrically insulated, load-responsive device which, if placed in the fashion of a common washer between a threaded fastening system's nut or bolt, and which, upon the application of a compressive load by tightening said fastening system's nut or bolt against said load responsive device and its parent material, produces a change in a minute, alternating current flow between it and two electrically conducting plates, which change in the minute current flow is detected and translated via electronic analog device and being visually displayed on a meter or electronic readout calibrated in pound force.

BRIEF DESCRIPTION OF THE DRAWING

In the drawing,

FIG. 1 represents a sectional side view of the force responsive bolt-preload indicating device placed in the fashion of a common washer between the nut of a threaded bolt and its parent material.

FIG. 2 shows a sectional side view of part of the prime force responsive and sensing device in its simplest usable form.

FIG. 3 represents a sectional side view of the device in FIG. 4, showing a resilient rubber-like material as a retainer of the device's three basic components.

FIG. 4 represents a compressive force responsive device as in FIGS. 1 and 2, without a center aperture therethrough.

FIG. 5 represents an exploded view of the same device as in FIG. 1, showing its basic three components.

FIG. 6 is one of the two electrical current conductive plates.

EXPLANATION

The device's function as a force-sensing and measuring transducer is based on a fundamental phenomena presently ascertained with reasonably certainty. The explanatory portion of the description herein is presented in the interest of clarification only and not as a limitation of the invention. A short account will be given wherein the growing process of the anodic-oxide coating onto a flat aluminum base material and the formation of said oxide coating's minute pores, which are important for the device's force-sensing ability, is discussed. This anodic-oxide coating may function as a variable load-sensing material and forms the basis of the conceptional philosophy of the compressive load-sensing transducer device in the invention herein.

Anodic-oxidation is an electrolytic (usually dc) conversion process. As current passes through the electrolyte, which may be sulfuric or chromic-acid solution, negatively charged ions of the acid solution migrate to the immersed aluminum platen (the Anode). Oxygen liberated from the electrolyte combines with the aluminum to form an oxide coating on the surface of the aluminum platen. Since the aluminum platen is totally submerged in the acid, it is also totally covered with the oxide coating, except for a minor portion where the base material is purposely masked off with a rubber-like material for the purpose of providing an electrical conductive connecting means for the terminal of an electrical current conducting wire thereto. To form an anodic-oxide coating on aluminum, the base material must be in contact with the electrolyte, consequently, the growth process is inward toward the material. That is to say, the first-produced coating is at the outer surface and the last-produced coating is at the interface of the aluminum and the coating.

Because the outer surface of the anodic-oxide coating is subjected to the chemical action longest, its structure is more porous than that of the inner coating, typical of the anodic-oxidation of the growth type. These minute pores are formed in the anodic-coating and are produced by the electrolyte, which has a solvent action on the oxide. The pores allow the electrolyte to penetrate to the base material and the growth process continues as long as a current is applied. Sulfuric acid, as the electrolyte, produces the smallest pores and chromic acid produces the largest ones.

For most commercial applications, the pores are an unwanted side product which must be closed so that the finish resists staining and corrosion. In the simplest sealing process, the anodic-oxide coating is exposed to boiling water which hydrates the oxide of the pores' walls and seals the outermost portion of the pores.

The thickness of the anodic-oxide coating can be controlled precisely from 1000 Angstrom to about 0.010 of an inch. It has been determined, however, that a coating thickness of 0.001 to 0.005 of an inch is more suitable for the purpose in the use of our invention.

It should be clear, however, that it is not our intention to patent the well-known "Anodizing" process described hereinbefore, but only our discovery of being able to use the anodic-oxide's unique quality and characteristics as a non-destructive force-sensing material.

SPECIFICATION

The anodic-oxide coating's minute pores play an important role in the workability in the basic concept of our invention. Basically, the anodic-oxide is an extremely hard material, possessing a tenacious resistance to compressive loads and to electrical current flow. Its inherent porosity, however, is responsible for, and makes possible, the material's minute compressibility under light to severe compressive load conditions, as well as for a minute but still electronically detectable electrical current-leak through the material's structure. Wherein the said minute electrical current-leak is inversely proportional to the material's minute compressability per unit force per unit area, and the applied voltage.

Therefore, consistent with the drawing, FIG. 2 shows the sectional side view of a portion of the device's prime load-sensing component, wherein 1 represents the device's electrically conductive aluminum base material (the Platen) and 2 represents the thereto on-grown electrically insulating anodic-oxide coating having two substantially flat surfaces 3 and 4, as well as having a center aperture 5 therethrough. 6 represents the platen's electrically conductive connecting tap having a minor portion 7 of its base material 1 exposed for the electrical connection of the terminal of an electrically conductive wire, which is not shown in the drawing. Such a singular member as in FIG. 2 represents the force-sensing device in its simplest usable form when used with at least one substantially flat, electrically conductive surface in a solid abutting contact with either its electrically insulating surfaces 2 or 3, while under compressive load conditions and while an alternating current is applied between the base material of the device's electrically conductive platen and said electrically conductive surface. This holds true for a device with or without the center aperture 5 therethrough.

FIG. 3 shows a sectional side view of a similar, but completely assembled, device not having a center aperture therethrough, comprising three basic components which are sandwiched together and are retained by a resilient rubber-like material 8 to form a singular combined unit.

9 represents the electrically conductive, prime load-sensing component's base material, comprising the thereto ongrown electrically insulating, anodic coating 10, which function is to electrically insulate and space and support the prime load-sensing component's electrically conductive base material 9 and the device's electrically conductive plates 11 and 12 through a predetermined distance equivalent to that of the oxide-coating's material thickness "A" from each other, while a variable light to severe transient-compressive load is applied thereto as indicated by the arrows in FIG. 4.

The anodic-oxide coating 10, due to its inherent extreme hardness, possesses a tenacious resistance to tremendous compressive load conditions (sometimes attaining as much as 50,000 to 100,000 PSI) without being subject to destruction under such rigorous abuse.

Due to the anodic-oxide coating's minute pores, however, it also possesses a minute compressibility which allows the device's electrically conductive platen 9 and its electrically conductive plates 11 and 12 to move minutely toward each other when subjected to an applied variable light to severe compressive load, which movement toward each other may be reversed through the release of the thereto applied opposing load even through repeated use.

FIG. 1 shows a sectional side view of a fully assembled variable force-sensing device installed in the fashion of a washer between the parent materials 14 and 15 and the threaded fastening device's nut 16 which is shown to be threaded onto the bolt 17. The actual force-sensing transducer assembly comprises the three basic components, including the lower electrically conductive base plate 18 and the prime force-sensing member 19 having the ongrown electrically insulating, as well as dimensionally spacing and load-supporting anodic-oxide coating 20 thereon, as well as comprising the upper electrically conductive plate 21. These basic three components are retained by the lower plate's cylindrical portion 22, which is protruding through the center aperture of the prime force-sensing member 19 and the upper electrically conductive plate 21 and is flanged outwardly and over the surface 23 of the upper plate 21, thus forming the singular combined sandwich-like assembly having a center aperture therethrough.

25 represents the electrical connecting tap, protruding perpendicularly outward from the device's centerline 26 and from the annular, prime force-sensing member 19, having a minor portion 27 of its electrically conductive base material exposed to the terminal of an alternating current conductive wire 28. 29 represents an electrically alternating current source. 30 and 31 are alternating-current conductive wires and 32 represents the system's electronic analog and readout device being connected between the fastening system's parent materials 14 and 15 or the bolt 17 on one side and the electrical connecting tap 25 on the other side, so as to form a semi-closed electrical current conductive circuit. That is to say, an electrical circuit which, by virtue of the anodic-oxide coating's tenacious resistance to electrical current flow, may be construed as being an open circuit. A very minute, but still detectable and measurable current-leak through the anodic-oxide coating 20 suggests, however, the electrical circuit 28 through 31 in connection with the prime force-sensing member 19 and the bolt 17 is a closed circuit. This is so even when the prime force-sensing member 19 is subjected to only a light compressive load.

The object is to utilize the anodic-oxide coating's unique ability to change its electrical current-leak resistance through an infinite range under from light to severe compressive load conditions. This change in electrical current-leak resistance is inversely proportional to the anodic-oxide coating's minute compressibility while being subjected to a change in the applied load.

As the nut 16, which is threaded onto the fastening system's bolt 17, is torqued against the force sensing transducer assembly's bearing surface 33, a compressive load is transmitted across the entire transducer assembly, pressing it with its bearing surface 34 against the surface 35 of the parent material 14 and via the parent materials 14 and 15 with the parent material's outer surface 36 onto the surface 37 of the bolt-head 38, which is compressing the transducer assembly solidly together. At this point, as the nut 16 is tightened more and more, the force-sensing transducer assembly's electrically conducting plates 18 and 21 are pressed with their substantially flat surfaces 39 and 40 against the prime force-sensing member's anodic-oxide coating's substantially flat surfaces 41 and 42, thereby causing a very minute movement of the assembly's lower and upper electrically conductive plates 18 and 21 toward the electrically insulated and electrically conductive base material (the Platen) 19. Thus, minutely compressing the electrically insulating anodic-oxide material, while remaining dimensionally relatively stable in supporting the device's platen 19 and its plates 18 and 21 through a predetermined distance equal to the compressed oxide coating's material thickness.

During the approach of the force transducer assembly's electrically conductive plates 18 and 21 toward its electrically conductive platen's base material 19, a minute change in the anodic-oxide coating's electrical current leak-resistance occurs which is inversely proportional to the magnitude of the oxide coating's minute dimensional change under varying load conditions. Said change in the anodic-oxide coating's electrical current leak-resistance, in turn, allows a minute, inversely proportional alternating electric current to flow through said anodic-oxide's structure between said platen and said plates, which minute alternating current-leak is detected, amplified, as well as electronically processed and visually displayed by the system's electronic analog and readout device 32 calibrated in pound force.

FIG. 5 shows the force-sensing transducer device's three basic components in exploded view, wherein 43 is the device's lower electrically conducting plate having a center aperture 44 therethrough and having the tubular retainment grommet 45 extending axially from said plate's surface 46 upward. 47 is the device's prime force-sensing, washer-like member, which, except for the minor portion 48 of the electrically exposed aluminum base material 49 on the member's electrical connecting tap 50, is otherwise completely covered by the anodic-oxide coating 51, and 52 is the center aperture therethrough. 53 is the device's upper base plate having the center aperture 54 for the reception of the lower plate's retainment grommet 45 therethrough.

FIG. 6 shows an alternate version of the lower base plate 55 having an annular dimensionally by "B" defined relatively flat and electrically conductive surface 56 protruding from the base material upward through the distance "C", and 57 is the center aperture therethrough.

The foregoing is considered as illustrative only of the principle of the invention. Since numerous modifications and changes will readily occur to those skilled in the art, it is not desired to limit the invention to the exact construction and operation shown and described. Accordingly, all modifications and equivalents falling within the scope of the invention may be resorted to.

What is claimed as new is as follows:

1. An infinite-range compressive load-sensing and measuring device, comprising a first flat, metallic, electrically conductive member, having at least one electrically conductive side surface;

and further comprising a second, flat, metallic, electrically conductive aluminum member having an electrically insulating surface material on each of its opposing sides;

said first and said second electrically conductive members each having means for connecting the terminal of an electric current carrying wire thereto;

an electrically conductive side surface of said first member and at least one of said second member's electrically insulated surfaces being in a full solid abutting contact with each other; thus, said first and second member in combination form a compressive load-responsive assembly;

wherein the electrically insulating material of said second member is the oxide of aluminum, being ongrown thereto to a predetermined thickness, utilizing the process of electrolytic conversion;

and wherein, upon the supply of an electric current to said first and said second electrically conductive members the application of an opposing light to severe compressive load to the flat outer surfaces of said first and said second members causes a minute, but electronically detectable, change in the electric current-leakage across the electrically insulating material of the second member;

which minute change in the electric current-leakage may be electronically detected, measured and displayed.

2. An infinite-range load-sensing and measuring device as in claim 1, comprising an additional third flat electrically conductive metallic member having at least one electrically conductive side surface;

wherein said first, said second and said third metallic members are of equal size;

said first, said second and said third electrically conductive metallic members being sandwiched together so as to allow electrically conductive side surfaces of said first and said third member to be in full solid abutting contact with opposite electrically insulating surfaces of said second electrically conductive member;

wherein said first, said second and said third members are retained together as a singular force-responsive assembly by a resilient rubber-like material, being formed peripherally around the outer edge of said assembly.

3. An infinite-range load-sensing device for the measuring of tensile stresses occurring in the bolt of a threaded fastening system under installation, having a center aperture therethrough comprising;
   a. a first annular, flat metallic, electrically conductive member having at least one electrically conductive side surface;
   b. a second annular, flat metallic, electrically conductive aluminum member having an electrically insulating surface material on each side, said second member comprising an electrical connecting tap;
   c. a third annular, flat metallic, electrically conductive member, having at least one electrically conductive side surface;
   wherein the electrically conductive side surfaces of said first and said third members are in a full solid, abutting contact with opposite electrically insulating surfaces of said second electrically conductive member, thus, forming a load-responsive assembly;
   wherein, upon the supply of an electric current to said annular first, second, and third elecrically conductive, members, the application of an opposing light to severe compressive load to the flat opposing outer surfaces of said first and said third annular members, causes a minute, but electronically detectable, change in the electric current-leakage across the electrical insulation of said second annular member; which minute change in the electric current-leakage may be electronically detected, measured and displayed.

4. An infinite-range load-indicating and measuring device as in claim 3, wherein the electrically insulating material of said second member is the oxide of aluminum, being ongrown thereto to a predetermined thickness, utilizing the process of electrolytic conversion.

5. An infinite-range load-sensing and measuring device as in claim 3, wherein said second metallic, electrically conductive member is totally covered by an electrically insulating material, except for a minor portion on the electrical connecting tap, and wherein said insulating material is the oxide of aluminum;
   said electrical connecting tap protruding outwardly from said second member's periphery for the reception of an electrical current carrying wire thereto.

6. An infinite-range load-sensing and measuring device as in claim 3, wherein said third, annular metallic, electrically conductive member comprises a tubular portion, which extends axially to the device's centerline from the inner edge of its center aperture, to form a grommet-like structure;
   and wherein the tubular portion of said third grommet-like member extends through the center aperture of said second and said first flat annular member and is flanged outward and over the outer surface of said first member, to retain the device's basic components as a singular assembly.

* * * * *